(12) United States Patent
Artemenko et al.

(10) Patent No.: US 12,716,987 B2
(45) Date of Patent: Aug. 25, 2026

(54) METHOD AND APPARATUS FOR PROCESSING DATA ASSOCIATED WITH AT LEAST ONE RADIO SIGNAL SOURCE

(71) Applicant: Robert Bosch GmbH, Stuttgart (DE)

(72) Inventors: Alexander Artemenko, Ehningen (DE); Karthik Muthineni, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 241 days.

(21) Appl. No.: 18/609,903

(22) Filed: Mar. 19, 2024

(65) Prior Publication Data

US 2024/0319315 A1 Sep. 26, 2024

(30) Foreign Application Priority Data

Mar. 22, 2023 (DE) ..................... 10 2023 202 558.2

(51) Int. Cl.
*G01S 5/02* (2010.01)
*G01S 13/00* (2006.01)

(52) U.S. Cl.
CPC .......... *G01S 5/0273* (2013.01); *G01S 13/003* (2013.01); *G01S 2205/02* (2020.05)

(58) Field of Classification Search
CPC ............................. G01S 5/0273; G01S 13/003
USPC ........................................................ 342/451
See application file for complete search history.

(56) References Cited

U.S. PATENT DOCUMENTS

2022/0137176 A1* 5/2022 Silverman ............... G01S 5/021 455/456.1
2024/0201356 A1* 6/2024 Dai ......................... G01S 7/006

FOREIGN PATENT DOCUMENTS

DE 102020215852 A1 6/2022
WO 2018031971 A1 2/2018
WO 2021221603 A1 11/2021

* cited by examiner

*Primary Examiner* — Harry K Liu
(74) *Attorney, Agent, or Firm* — Michael Best & Friedrich LLP

(57) ABSTRACT

A method for processing data associated with at least one radio signal source, said method comprising: receiving at least one multi-path received signal associated with the radio signal source comprising signal components associated with different signal paths, determining at least one property of at least one of the signal components, providing position information characterizing at least one position of an apparatus receiving the at least one multi-path received signal, determining a position of the at least one radio signal source based on the at least one property of at least one of the signal components and on the position information.

12 Claims, 5 Drawing Sheets

METHOD AND APPARATUS FOR PROCESSING DATA ASSOCIATED WITH AT LEAST ONE RADIO SIGNAL SOURCE

BACKGROUND

This disclosure relates to a method and for processing data associated with at least one radio signal source.

The disclosure further relates to an apparatus for processing data associated with at least one radio signal source.

SUMMARY

Exemplary embodiments relate to a method, e.g. a computer-implemented method, for processing data associated with at least one radio signal source, said method comprising: receiving at least one multi-path received signal associated with the radio signal source, comprising signal components associated with different signal paths, determining at least one property of at least one of the signal components, providing position information characterizing at least one position of an apparatus receiving the at least one multi-path received signal, determining a position of the at least one radio signal source based on the at least one property of at least one of the signal components and the position information. In further exemplary embodiments, the principle according to the embodiments can, e.g., be used to efficiently determine a position of the at least one radio signal source in an indoor environment, for example, within a structure such as a building and/or vehicle (e.g., a marine vessel such as a container ship).

In further exemplary embodiments, the position information can be characterized or represented by a model and/or a plan, e.g., a structure, e.g., a building, from which, e.g., the position of the device receiving the at least one multi-path received signal as well as optionally the position of at least one further facility or of features of the structure (e.g., walls) can be seen or determined.

In further exemplary embodiments, it is provided that the at least one radio signal source is at least temporarily mobile, e.g., at least temporarily associated with a mobile facility or a mobile system such as a driverless transport system.

In further exemplary embodiments, it is provided that the at least one radio signal source is at least temporarily stationary.

In further exemplary embodiments, it is provided that the at least one radio signal source is a terminal device for a wireless communication system or is associated with a terminal device for a wireless communication system or is integrated into a terminal device for a wireless communication system. For example, the wireless communication system is a cellular system, e.g., based on or compatible with a 5G standard or a 6G standard.

In further exemplary embodiments, it is provided that the at least one radio signal source is a network-side device, e.g., a base station for a wireless communication system.

In further exemplary embodiments, it is provided that the method comprises: a) determining an angle of incidence, for example angle of arrival, AoA, of at least one of the signal components, e.g., multiple, e.g. all, signal components, and/or b) determining an arrival time, for example time of arrival, ToA, of at least one of the signal components, e.g. multiple, e.g. all, signal components.

For example, in further exemplary embodiments, the angle of incidence of a signal component is the at least one property of at least one of the signal components.

For example, in further exemplary embodiments, the arrival time of a signal component is the at least one property of at least one of the signal components.

For example, in further exemplary embodiments, the angle of incidence of a signal component and the arrival time of the same signal component characterize the at least one property (thus, e.g., two properties) of at least one of the signal components.

In further exemplary embodiments, it is provided that the method comprises: a) selecting, e.g., filtering, the signal components, e.g., based on a respective arrival time of a relevant signal component, whereby selected signal components are obtained, whereby selecting is, e.g., performed to eliminate such signal components associated with higher order reflections. In further exemplary embodiments, this can be achieved by, e.g., only selecting signal components whose arrival time falls below a specifiable threshold value.

In other exemplary embodiments, it is provided that the method comprises: determining the position of the at least one radio signal source based on the at least one property (e.g., angle of incidence and/or arrival time) of at least one, e.g., multiple, e.g., all, of the selected signal components and on the position information.

In other exemplary embodiments, it is provided that the method comprises: identifying at least one object, e.g. obstacles, based on an angle of incidence of at least one (or a multiple of all) of the signal components and the position information, and, optionally, determining a position of a reflection point of at least one of the signal components on the object based on an angle of incidence of at least one (or all) of the signal components and the position information.

In other exemplary embodiments, it is provided that the method comprises: using further signal components in order to, e.g., reduce an uncertainty regarding determining the position of the at least one radio signal source. In further exemplary embodiments, the further signal components can, e.g., be such signal components, e.g., of the same multi-path received signal, which are associated with higher order reflections (e.g., which have initially been filtered out, see above), and/or signal components of at least one further multi-path received signal.

Further exemplary embodiments relate to an apparatus for performing the method according to the embodiments.

Further exemplary embodiments relate to a computer-readable storage medium comprising instructions that, when executed by a computer, prompt the latter to perform the method according to the exemplary embodiments.

Further exemplary embodiments relate to a computer program comprising instructions that, when the program is executed by a computer, prompt the latter to perform the method according to the embodiments.

Further exemplary embodiments relate to a data carrier signal that transmits and/or characterizes the computer program according to the embodiments.

Further exemplary embodiments relate to a terminal device, e.g., for a wireless communication system comprising at least one apparatus according to the exemplary embodiments.

Further exemplary embodiments relate to a network-side device, e.g., a base station, for a wireless communication system comprising at least one apparatus according to the exemplary embodiments.

Further exemplary embodiments relate to a system, e.g., an industrial environment, e.g., for a manufacturing facility, having at least one apparatus according to the exemplary embodiments and/or at least one terminal device according to the embodiments and/or at least one network-side device according to the exemplary embodiments.

Further exemplary embodiments relate to a manufacturing facility having at least one apparatus according to the exemplary embodiments and/or at least one terminal device according to the exemplary embodiments and/or at least one network-side device according to the exemplary embodiments and/or at least one system according to the exemplary embodiments.

Further exemplary embodiments relate to a use of the method according to the exemplary embodiments and/or the apparatus according to the exemplary embodiments and/or the computer-readable storage medium according to exemplary embodiments and/or the computer program according to exemplary embodiments and/or the data carrier signal according to the exemplary embodiments and/or the terminal device according to the exemplary embodiments and/or the network-side device according to the exemplary embodiments and/or the system according to the exemplary embodiments and/or the manufacturing facility according to the exemplary embodiments for at least one of the following elements: a) determining the position of the at least one radio signal source, b) increasing a precision in determining the position, c) controlling mobile systems, e.g., driverless transport systems, d) omitting the use of signals associated with a direct line of sight, e) fusing information regarding the position of the at least one radio signal source.

Further features, possible applications, and advantages of the invention emerge from the following description of exemplary embodiments of the invention, which are shown in the figures of the drawings. All described or depicted features by themselves or in any combination constitute the subject matter of the invention regardless of their wording or representation in the description or in the drawings.

DETAILED DESCRIPTION

Figure 1:
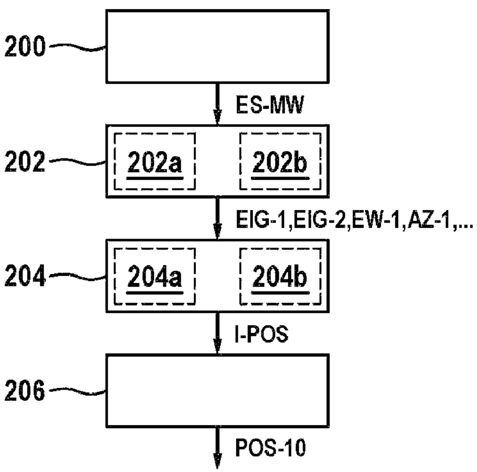
FIG. 1 schematically illustrates a simplified flowchart according to exemplary embodiments, FIG. 2 schematically illustrates a simplified block diagram according to exemplary embodiments, FIG. 3 schematically illustrates a simplified flow chart according to exemplary embodiments, FIG. 4 schematically illustrates a simplified flow chart according to exemplary embodiments, FIG. 5 schematically illustrates a simplified flow chart according to exemplary embodiments, FIG. 6 schematically illustrates a simplified scenario according to exemplary embodiments, FIG. 7 schematically illustrates a simplified flow chart according to exemplary embodiments, FIG. 8 schematically illustrates a simplified block diagram according to exemplary embodiments, FIG. 9 schematically illustrates aspects of uses according to embodiment examples.

Exemplary embodiments (FIGS. 1 and 2) relate to a method, e.g. a computer-implemented method, for processing data associated with at least one radio signal source 10 (FIG. 2), said method comprising: receiving 200 (FIG. 1) at least one multi-path received signal ES-MW associated with the radio signal source 10 comprising signal components SK-1, SK-2, . . . , which are associated with different signal paths SW-1, SW-2, . . . . The different signal paths SW-1, SW-2, . . . result from, e.g., reflections and/or scattering of radio signals transmitted by the radio signal source 10 at one or more objects OBJ, e.g., obstacles and/or components of a surrounding structure (e.g., walls of a building), etc.

The method further comprises: determining 202 at least one property EIG-1, EIG-2, . . . of at least one of the signal components, providing 204 position information I-POS that characterizes at least one position POS-100 of an apparatus 100 receiving the at least one multi-path ES-MW received signal, determining 206 a position POS-10 of the at least one radio signal source 10 based on the at least one property EIG-1, EIG-2 of at least one of the signal components and the position information I-POS. For example, the apparatus 100 is associated with a facility 20 which can, e.g., at least temporarily operate as a receiving facility for signals transmitted from the radio signal source 10.

In further exemplary embodiments, the principle according to the embodiments can be used to, e.g., efficiently determine a position POS-10 of the at least one radio signal source in an indoor environment, e.g., within a structure such as a building and/or vehicle.

In further exemplary embodiments, the position information I-POS can be characterized or represented by a model and/or a plan, e.g. a structure, e.g. a building, from which, e.g., the position POS-100 of the apparatus 100 receiving the at least one multi-path received signal ES-MW as well optionally as the position of at least a further facility or of features of the structure (e.g., the position of the object OBJ) can be apparent or determined.

In further exemplary embodiments (FIG. 2) it is provided that the at least one radio signal source 10 is at least temporarily mobile, e.g., at least temporarily associated with a mobile facility or a mobile system such as a driverless transport system.

In further exemplary embodiments, it is provided that the at least one radio signal source 10 is at least temporarily stationary.

In further exemplary embodiments, it is provided that the at least one radio signal source 10 is a terminal device for a wireless communication system or is associated with a terminal device for a wireless communication system or is integrated into a terminal device for a wireless communication system. For example, the wireless communication system is a cellular system, e.g., based on or compatible with a 5G standard.

In further exemplary embodiments, it is provided that the at least one radio signal source 10 is a network-side device, e.g., a base station, for a wireless communication system.

In further exemplary embodiments (FIG. 1) it is provided that the method comprises: a) determining 202*a* an angle of incidence EW-1, e.g. angle of arrival, AoA, of at least one of the signal components SK-1, e.g. multiple, e.g. all, signal components, and/or b) determining 202*b* an arrival time AZ-1, e.g. time of arrival, ToA, of at least one of the signal components SK-1, e.g. multiple, e.g. all, signal components.

For example, in further exemplary embodiments, the angle of incidence EW-1 of a signal component SK-1 is the at least one property EIG-1 of at least one of the signal components SK-1.

For example, in further exemplary embodiments, the arrival time AZ-1 of a signal component SK-1 is the at least one property EIG-2 of at least one of the signal components SK-1.

For example, in further exemplary embodiments, the angle of incidence EW-1 of a signal component SK-1 and the arrival time AZ-1 of the same signal component SK-1 characterize the at least one property or the properties EIG-1, EIG-2 of at least one of the signal components SK-1.

In further exemplary embodiments (FIG. 1) providing 204 the position information I-POS comprises at least one of the following elements: a) retrieving 204*a* the position information I-POS, e.g., from a further facility, e.g. a database (not shown), b) receiving 204*b* the position information I-POS, e.g. from a further facility, e.g. sending the position information I-POS to an apparatus 100 performing the aspect 204*b*.

Figure 3:
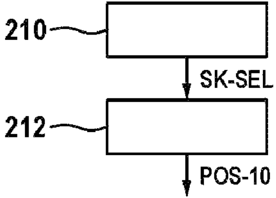

In further exemplary embodiments (FIG. 3) it is provided that the method comprises: a) selecting, e.g. filtering, 210 the signal components SK-1, SK-2, . . . , e.g. based on a respective arrival time of a relevant signal component, whereby selected signal components SK-SEL are obtained, whereby, e.g., selecting 210 is performed to eliminate such signal components associated with higher order reflections (e.g., multiple reflections of the signal components at one or more obstacles along the signal path). In further exemplary embodiments, this can be achieved by, e.g., only selecting signal components whose arrival time falls below a specifiable threshold value.

In further exemplary embodiments (FIG. 3) it is provided that the method comprises: determining 212 the position POS-10 of the at least one radio signal source 10 based on the at least one property (e.g., angle of incidence and/or arrival time) of at least one, e.g. multiple, e.g. all, of the selected signal components SK-SEL and on the position information I-POS (FIG. 1).

Figure 4:
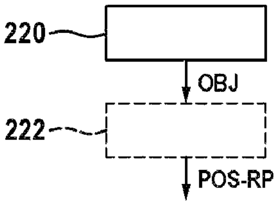

In further exemplary embodiments (FIG. 4) it is provided that the method comprises: identifying 220 at least one object OBJ (see also FIG. 2), e.g. obstacles based on an angle of incidence EW-1 of at least one of the signal components SK-1 (or several or all of) the signal components and on the position information I-POS, and, optionally, determining 222 a position POS-RP of a reflection point of at least one of the signal components on the object OBJ based on an angle of incidence EW-1 of at least one (or several or all of) the signal components and the position information I-POS.

Figure 5:
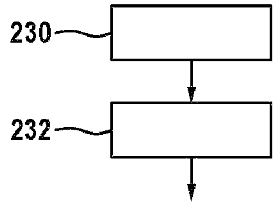
Figure 6:
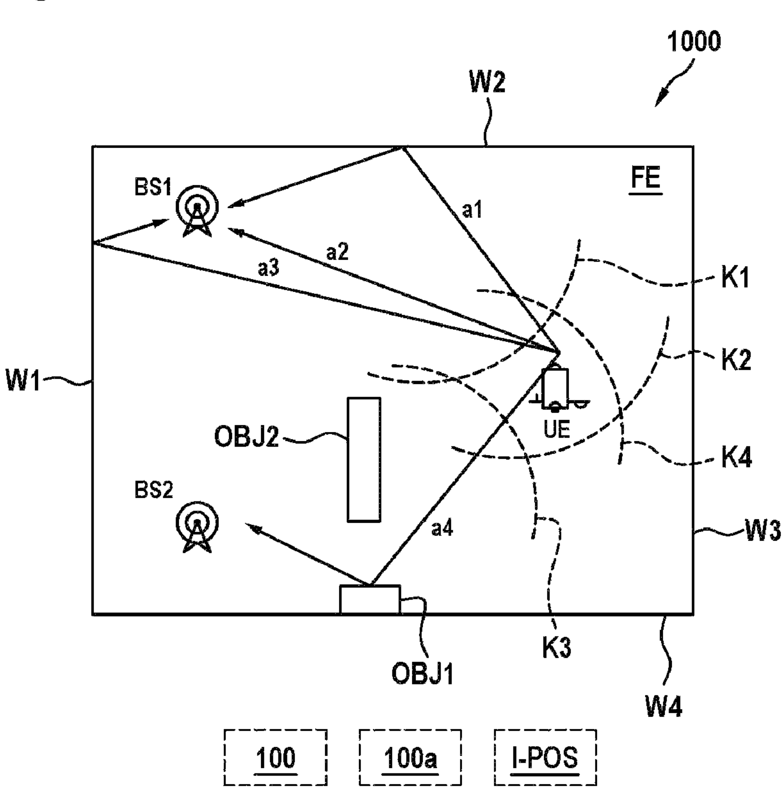

In further exemplary embodiments (FIG. 5) it is provided that the method comprises: using 230 further signal components, e.g., to reduce 232 an uncertainty regarding determining the position POS-10 of the at least one radio signal source 10. In further exemplary embodiments, the further signal components can, e.g., be such signal components of, e.g., the same multi-path received signal ES-MW (FIGS. 1, 2), which are associated with higher order reflections (and which have, e.g., initially been filtered out; see hereinabove and block 210 in FIG. 3), and/or signal components of at least one further multi-path received signal, as schematically shown in, e.g., FIG. 6, a scenario according to further exemplary embodiments. Shown is a system 1000 comprising, e.g., an industrial manufacturing facility FE or associated with an industrial manufacturing facility FE. By way of example, FIG. 6 shows four walls W1, W2, W3, W4 that at least partially border a structure (e.g., building) of the manufacturing facility FE at least in some spatial directions, and on which, e.g., reflections of radio signals may occur.

Elements BS1, BS2 indicate two base stations of a wireless communication system, e.g., gNB in the case of a 5G-based communication system. A mobile terminal device UE is also illustrated by way of example. The terminal device UE at least temporarily operates as a radio signal source, e.g., in the context of element 10 according to FIG. 2, and transmits radio signals a1, a2, a3, a4, which can be determined for at least one gNB BS1, BS2 (and/or at least one other device, which is not shown). It is evident from FIG. 6 that the radio signal a1 is reflected on the wall W2 before it can be received by the gNB BS1. It is further evident from FIG. 6 it that the radio signal a3 is reflected on the wall W1 before it can be received by the gNB BS1. It is evident from FIG. 6 that the radio signal a4 is reflected on the object OBJ1 before it can be received by the gNB BS2. In contrast, the radio signal a2 can be received, e.g., directly from the gNB BS1, via a direct line of sight, i.e., without reflections.

Accordingly, arrows a1, a3, a4 indicate signal components of at least one multi-path received signal according to exemplary embodiments that can be received by at least one gNB BS1, BS2. For example, at least one of the gNBs BS1, BS2 can comprise an apparatus 100 according to exemplary embodiments and thus perform at least some aspects of the method according to the embodiments in order to, e.g., determine a position of the terminal device UE based on, e.g., the signal components a1, a2, a3, e.g., in an uplink direction.

By way of example, the position information I-POS can, e.g., be used as a plan or a model of the structure of the manufacturing facility FE and used for determining the position of the terminal device UE, e.g., together with the signal components a1, a2, a3.

In further exemplary embodiments, the position information I-POS or the plan or model can comprise further information, e.g., at least one of the following elements: properties of at least one object OBJ1, OBJ2, e.g., a shape and/or material properties (e.g. glass, concrete, metal), and/or reflectance properties such as a reflectance coefficient.

In further exemplary embodiments, the position information can be updated I-POS, e.g., repeatedly, e.g., periodically.

The dashed curves K1, K2 indicate, by way of example, an area within the manufacturing facility FE in which a probability of stay of the terminal device UE exceeds a specifiable threshold value based on an evaluation according to exemplary embodiments by the gNB BS1.

The dashed curves K3, K4 indicate, by way of example, an area within the manufacturing facility FE in which a probability of stay of the terminal device UE exceeds a specifiable threshold value based on an evaluation according to exemplary embodiments by the gNB BS2. In further exemplary embodiments, the position of the terminal device UE can in this way be efficiently restricted to a comparatively small area or space, and a position of the terminal device UE can, e.g., be determined without requiring a direct line of sight or without evaluating signal components a2 associated with a direct line of sight.

In further exemplary embodiments (FIG. 6) further objects OBJ2 which can also cause a multi-path propagation of radio signals can also be provided in the system 1000, the associated signal components of which can, e.g., be evaluated in the manner described hereinabove in an exemplary manner.

In further exemplary embodiments, the method is also applicable to other, e.g., also more complex, scenarios, e.g., including more or fewer objects, and/or terminal devices, and/or base stations, and/or features W1, W2, W3, W4 of structures.

In further exemplary embodiments (FIG. 6) the terminal device UE can comprise an apparatus 100*a*, which features functionality comparable to the apparatus 100 and can, e.g., therefore perform at least some aspects of the method according to the embodiments in order to, e.g., determine a position of another facility (e.g., gNB BS1, BS2 or others, such as a handset or facility) and, e.g., based on signal components (not shown) receivable in a downlink direction.

In further exemplary embodiments, at least one of the facilities UE, BS1, BS2 can comprise an antenna system or antenna that enables an angle of incidence to be determined, e.g., an antenna array comprising a plurality of antenna elements.

Figure 7:
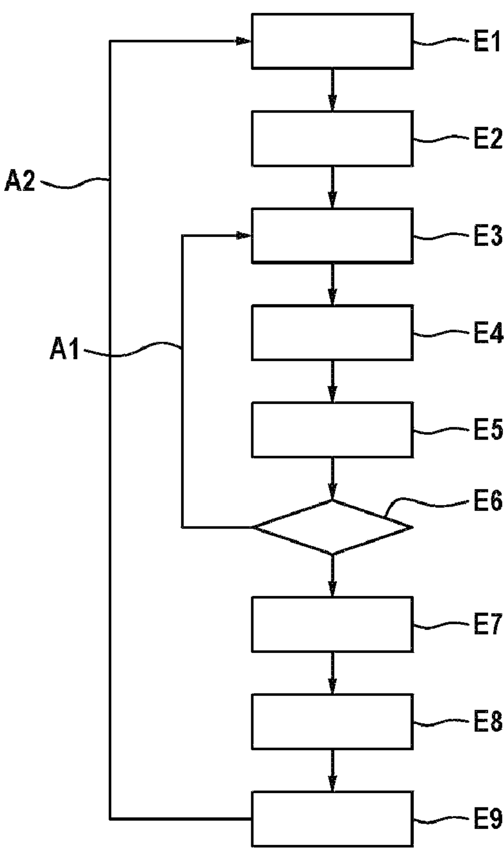

FIG. 7 schematically illustrates a simplified flow chart of a method according to exemplary embodiments that is, e.g., applicable to the exemplary scenario of FIG. 6.

Element E1 indicates that the terminal device UE (FIG. 6) transmits radio signals, e.g., reference signals, e.g., based on a cellular standard, e.g., positioning reference signals, based on a 5G or a 6G standard.

As previously described hereinabove with reference to FIG. 6, the radio signals of the terminal device UE experience reflections upon interaction with elements W1, . . . , W4, OBJ1, OBJ2 in their surroundings, (see, e.g., the arrows a1, a3, a4, which results in, e.g., multi-path received signals that can be received by gNB BS1, BS2). See also element E2 according to FIG. 7, whereby individual signal components a1, a3 impact a receiver BS1, e.g., from different directions.

Optionally, element E2 can also feature the determination of properties (e.g., angle of incidence, arrival time and optionally other properties) of the signal components SK-1, SK-2, . . . .

Optionally, gNB BS1, BS2 can organize the received multi-path received signals or their signal components SK-1, SK-2, . . . , e.g., in the form of a list, e.g., sorted by arrival times, which can also be implemented in block E2.

In further exemplary embodiments, signal components of a multi-path received signal that only experience a single reflection reach the receiver (e.g., gNB BS1) faster than such signal components that experience multiple (e.g., two or more) reflections.

In further exemplary embodiments, only signal components comprising first-order reflections at least temporarily (one-time reflection) are used. Accordingly, element E3 according to FIG. 7 indicates a selection or filtering of the signal components with first-order reflections, e.g., from the sorted list.

Element E4 according to FIG. 7 indicates an optional determination of properties (e.g., angle of incidence and/or arrival time) of the signal components selected according to element E3.

Element E5 indicates determining, e.g., detecting and/or identifying, objects (e.g., obstacles OBJ1, OBJ2) based on, e.g., the position information I-POS and the angles of incidence of the signal components selected according to element E3. Optionally, a respective reflection point from which a respective signal component emanates can also be determined.

Element E6 indicates a determination of the position POS-10 of the radio signal source UE, e.g., based on the information from element E5 and/or based on a shape and/or a type and/or a reflectance coefficient, e.g., of the object OBJ1 and/or the walls W1, W2, . . . .

For example, if an object OBJ1 has a comparatively smooth surface (e.g., smooth surface for the radio signals), Skellies' law of reflectance is applicable, according to which an angle of incidence is equal to the reflectance angle.

Element E7 according to FIG. 7 indicates the consideration of further multi-path received signals for the position determination E8, whereby existing uncertainties can optionally be reduced. For example, the gangs BS1, BS2 can cooperate (see element E9) in order to fuse its information regarding the position determination based on, e.g., respective received multi-path received signals, whereby the precision of the position determination can be increased in further exemplary embodiments.

Arrow A1 according to FIG. 7 indicates an optional branching of element E6 to element E3 in order to, e.g., include further signal components which may not have been previously considered, e.g., signal components with higher order reflections, in the position determination.

Arrow A2 according to FIG. 7 indicates an optional branching of element E9 to element E1, thus an optional repetition of the exemplary flow according to FIG. 7.

Figure 8:
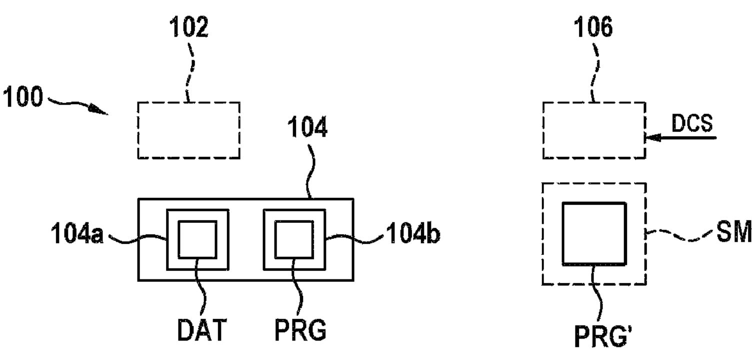

Further exemplary embodiments (FIG. 8) relate to an apparatus 100 for performing the method according to the embodiments.

The apparatus 100 comprises a computing means ("computer") 102 comprising at least one computer core (not shown) and a storage means 104 associated with the computing means 102 for at least temporarily storing data DAT and/or computer programs PRG (e.g., for performing aspects according to the exemplary embodiments). The storage means 104 can, e.g., comprise a volatile memory 104*a* (e.g., random access memory, RAM) and/or a non-volatile memory 104*b* (e.g., flash EEPROM).

For example, the data DAT are associated with at least one of the following elements characterize, e.g., at least one of the following elements: a) multi-path received signal ES-MW, b) signal component(s) SK-1, SK-2, . . . , c) property (properties) EIG-1, EIG-2, . . . , d) position information I-POS, POS-10, POS-100.

In further preferred exemplary embodiments, it is provided that the apparatus 100 can comprise a (preferably bi-directional) data interface 106 for, e.g., data communication.

For example, the apparatus 100 is associated with the facility 20 (FIG. 2) operating at least temporarily as a receiving facility for signals transmitted from the radio signal source 10.

Further exemplary embodiments relate to a computer-readable storage medium SM comprising instructions PRG' that, when executed by a computer 102, prompt the latter to perform the method according to the embodiments.

Further exemplary embodiments relate to a computer program PRG, PRG' comprising instructions that, when the program PRG is executed by a computer 102, prompt the latter to perform the method according to the embodiments.

Further exemplary embodiments relate to a data carrier signal DCS that transmits and/or characterizes the computer program PRG, PRG' according to the exemplary embodiments.

Further exemplary embodiments (FIG. 6) relate to a terminal device UE for a wireless communication system comprising at least one apparatus 100*a* according to the exemplary embodiments. The apparatus 100*a* features, e.g., functionality similar to or identical to the apparatus 100 according to FIG. 8.

Further exemplary embodiments (FIG. 6) relate to a network-side device, e.g., for a base station BS1, BS2 for a wireless communication system comprising at least one apparatus 100 according to the exemplary embodiments.

Figure 2:
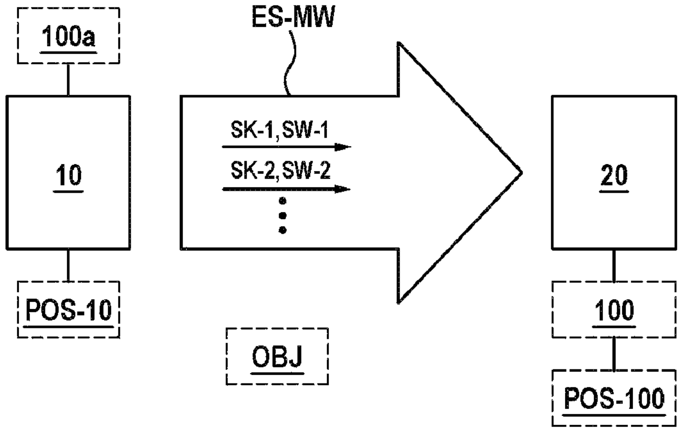

In further exemplary embodiments, the principle according to the exemplary embodiments can, e.g., be used in an uplink transmission direction in which, e.g., a terminal device UE transmits radio signals, e.g., reference signals, in the uplink transmission direction for, e.g., reception by at least one base station BS1, BS2, thus representing the radio signal source 10 according to FIG. 2. At least parts of the uplink radio signals, e.g., reference signals, can be received by, e.g., at least one base station BS1, BS2, which enables a determination of the position of the terminal device UE by the at least one base station BS1, BS2 according to exemplary embodiments.

In further exemplary embodiments, the principle according to the exemplary embodiments can, e.g., be used in a downlink transmission direction in which, e.g., a network-side device, e.g., a base station BS1, radio signals, e.g. reference signals, in the downlink transmission direction for, e.g., reception by at least one terminal device UE, thus representing the radio signal source 10 according to FIG. 2. At least parts of the downlink radio signals, e.g., reference signals, can, e.g., be received by at least one terminal device UE, which enables a determination of the position of the base station BS1 by the terminal device UE according to exemplary embodiments.

In further exemplary embodiments, the principle is also applicable in sidelink radio transmissions, e.g., between different terminal devices, in accordance with the exemplary embodiments.

Further exemplary embodiments (FIG. 6) relate to a system 1000, e.g., an industrial environment, e.g., for a manufacturing facility FE, having at least one apparatus 100, 100*a* according to the exemplary embodiments and/or at least one terminal device UE according to the exemplary embodiments and/or at least one network-side device BS1, BS2 according to the exemplary embodiments.

Further exemplary embodiments (FIG. 6) relate to a manufacturing facility FE having at least one apparatus 100, 100*a* according to the exemplary embodiments and/or at least one terminal device UE according to the exemplary embodiments and/or at least one network-side device BS1, BS2 according to the exemplary embodiments and/or at least one system 1000 according to the exemplary embodiments.

Figure 9:
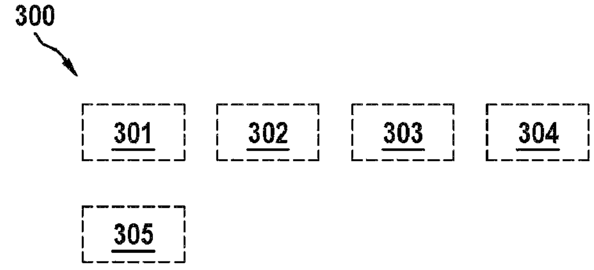

Further exemplary embodiments (FIG. 9) relate to a use 300 of the method according to the exemplary embodiments and/or the apparatus 100, 100*a* according to the exemplary embodiments and/or the computer-readable storage medium SM according to exemplary embodiments and/or the computer program PRG, PRG' according to exemplary embodiments and/or the data carrier signal DCS according to the exemplary embodiments and/or the terminal device UE according to the exemplary embodiments and/or the network-side device BS1, BS2 according to the exemplary embodiments and/or the system 1000 according to the exemplary embodiments and/or the manufacturing facility FE according to the exemplary embodiments for at least one of the following elements: a) determining 301 the position of the at least one radio signal source 10, b) increasing 302 a precision in determining the position, c) controlling 303 mobile systems, e.g., driverless transport systems, d) omitting 304 the use of signals a2 associated with a direct line of sight, e) fusing 305 information regarding the position of the at least one radio signal source.

The principle according to the exemplary embodiments enables, e.g., precise position determination for indoor systems, e.g. in the industrial field, such as in manufacturing facilities within buildings or other structures, in which, e.g., multi-path propagation of radio signals occurs, e.g. due to radio signals reflecting properties of structural features of, e.g., the building and/or of facilities in the building (e.g., manufacturing systems, control panels, cable runs, etc.).

The principle according to the exemplary embodiments enables, e.g., precise position determination of mobile systems (e.g., driverless transport systems) comprising terminal devices UE or mobile systems UE.

The invention claimed is:

1. A computer-implemented method for processing data associated with a radio signal source (10), wherein an apparatus (100) receives a signal from the radio signal source (10), said method comprising:

receiving (200) a multi-path received signal (ES-MW) transmitted by the radio signal source (10) comprising signal components (SK-1, SK-2, . . . ) which are associated with different signal paths (SW-1, SW-2, . . . ), determining (202) a property (EIG-1, EIG-2, . . . ) of at least one of the signal components (SK-1, SK-2, . . . ), providing (204) position information (I-POS), which characterizes a position (POS-100) of the apparatus (100) receiving the multi-path received signal (ES-MW), and determining (206) a position (POS-10) of the radio signal source (10) based on the property (EIG-1, EIG-2, . . . ) of at least one of the signal components (SK-1, SK-2, . . . ) and the position information (I-POS).

2. The method according to claim 1, comprising: a) determining (202*a*) an angle of incidence (EW-1) of at least one of the signal components (SK-1, SK-2, . . . ), and/or b) determining (202*b*) an arrival time (AZ-1) of at least one of the signal components (SK-1, SK-2SK-2, . . . ).

3. The method according to claim 1, comprising at least one of the following elements: a) filtering, (210) the signal components (SK-1, SK-2, . . . ) based on a respective arrival time (AZ-1, AZ-2, . . . ) of a relevant signal component (SK-1, SK-2, . . . ) to eliminate such signal components associated with higher order reflections, b) determining (212) the position (POS-10) of the radio signal source (10) based on the property (EIG-1, EIG-2, . . . ) of at least one of the selected signal components (SK-SEL) and the position information (I-POS).

4. The method according to claim 1, comprising: identifying (220) an object (OBJ) based on an angle of incidence (EW-1) of at least one of the signal components (SK-1, SK-2, . . . ) and on the position information (I-POS), and determining (222) a position (POS-RP) of a reflection point of at least one of the signal components (SK-1, SK-2, . . . ) on the object (OBJ) based on an angle of incidence (EW-1) of at least one of the signal components (SK-1, SK-2, . . . ) and the position information (I-POS).

5. The method according to claim 1, comprising: using (230) further signal components (SK-1, SK-2, . . . ) to reduce an uncertainty regarding the determination (206) of the position (POS-10) of the radio signal source (10) (232).

6. The method according to claim 1, wherein the method is used in an indoor environment.

7. The method according to claim 1, wherein a) the at least one radio signal source (10) is mobile and/or wherein b) the radio signal source (10) is a terminal device for a wireless communication system, and/or wherein c) the radio signal source (10) is a network-side device, for example a base station for a wireless communication system.

8. An apparatus (100; 100*a*) for performing the method according to claim 1.

9. A terminal device (UE) for a wireless communication system comprising an apparatus (100; 100*a*) according to claim 8.

10. A system (1000) for an industrial environment comprising an apparatus (100; 100*a*) according to claim 8.

11. A non-transitory computer-readable storage medium (SM) comprising instructions (PRG) for processing data associated with a radio signal source (10), wherein an apparatus (100) receives a signal from the radio signal source (10), and the instructions (PRG), when executed by a computer (402), cause the computer to receive (200) a multi-path received signal (ES-MW) transmitted by radio signal source (10), comprising the signal components (SK-1, SK-2, . . . ) which are associated with different signal paths (SW-1, SW-2, . . . ), determine (202) a property (EIG-1, EIG-2, . . . ) of at least one of the signal components (SK-1, SK-2, . . . ), provide (204) position information (I-POS), which characterizes the at least one-position (POS-100) of the apparatus (100) receiving the multi-path received signal (ES-MW), and determine (206) a position (POS-10) of the radio signal source (10) based on the property (EIG-1, EIG-2, . . . ) of at least one of the signal components (SK-1, SK-2, . . . ) and the position information (I-POS).

12. A computer-implemented method for processing data associated with a radio signal source (10), the method comprising:

receiving (200) a multi-path received signal (ES-MW) transmitted by the radio signal source (10), comprising a plurality of signal components (SK-1, SK-2, . . . ) which are associated with different signal paths (SW-1, SW-2, . . . );

determining (202), for at least one of the signal components (SK-1, SK-2, . . . ), a property (EIG-1, EIG-2, . . . ) comprising an angle of incidence (EW-1) and an arrival time (AZ-1);

providing (204) position information (I-POS), which characterizes a position (POS-100) of an apparatus (100) receiving the multi-path received signal (ES-MW), wherein the position information (I-POS) characterizes a surrounding structure;

selecting (210) a subset of the signal components (SK-1, SK-2, . . . ) as selected signal components (SK-SEL) based on arrival times (AZ-1, AZ-2, . . . ) such that signal components (SK-1, SK-2, . . . ) associated with higher-order reflections are excluded from the selected signal components (SK-SEL);

identifying (220) an object (OBJ) of the surrounding structure based on the position information (I-POS) and the angle of incidence (EW-1) of at least one selected signal component (SK-SEL), and determining (222) a position (POS-RP) of a reflection point of the at least one selected signal component (SK-SEL);

determining (206) a position (POS-10) of the radio signal source (10) based on a property (EIG-1, EIG-2, . . . ) of at least one of the selected signal components (SK-SEL) and the position information (I-POS);

reducing (232) an uncertainty associated with determining the position (POS-10) of the radio signal source (10) by using further signal components, wherein the further signal components comprise signal components associated with higher-order reflections and signal components of at least one further multi-path received signal (ES-MW).

* * * * *